United States Patent [19]
Bell et al.

[11] 3,993,784
[45] Nov. 23, 1976

[54] CONTROLLED FERMENTATION ACIDITY OF BRINED CUCUMBERS

[75] Inventors: Thomas A. Bell; John L. Etchells; Raymond E. Kelling, all of Raleigh; James L. Olsen, Chapel Hill, all of N.C.

[73] Assignee: The United States of America as represented by the Department of Agriculture, Washington, D.C.

[22] Filed: May 11, 1972

[21] Appl. No.: 252,409

[52] U.S. Cl............................. 426/49; 426/231; 23/253 TP; 252/408
[51] Int. Cl............................. A23b 7/10
[58] Field of Search.................. 99/156; 23/253 TP; 252/408; 426/50, 49

[56] References Cited
UNITED STATES PATENTS

| | | | |
|---|---|---|---|
| 3,236,601 | 2/1966 | Harvill | 23/253 TP |
| 3,255,019 | 6/1966 | Engelland | 99/156 |
| 3,374,099 | 3/1968 | Bell et al. | 99/156 |

OTHER PUBLICATIONS

Bell, T. A., Etchells, J. L., and Kelling, R. E., Journal of Food Science, 36, 1036–1038, Nov. 1971.

Bell, T. A., et al., Journal of Food Science, 26, No. 1, pp. 84–90, 1961.

Whitehead, T. H., Chemical Abstracts, vol. 53, 21366i, 1959.

Fossum, J. H., Chemical Abstracts, vol. 45, 4599i, 1951.

Riddick, J. A., Chemical Abstracts, vol. 56, 10884d, 1962.

Etchells, J. L. et al., Food Technology, vol. XII, No. 5, pp. 204–208, May 1958.

The Canning Trade, *A Complete Course in Canning*, 9th ed. 1969, pp. 473–481.

*Primary Examiner*—A. Louis Monacell
*Assistant Examiner*—Curtis P. Ribando
*Attorney, Agent, or Firm*—Irons & Sears

[57] ABSTRACT

In the salting of vegetables, such as cucumbers, control of fermentation using brine acidity as the monitor and continually and rapidly determining brine acidity with tris(hydroxymethyl)aminomethane as a standard.

7 Claims, 1 Drawing Figure

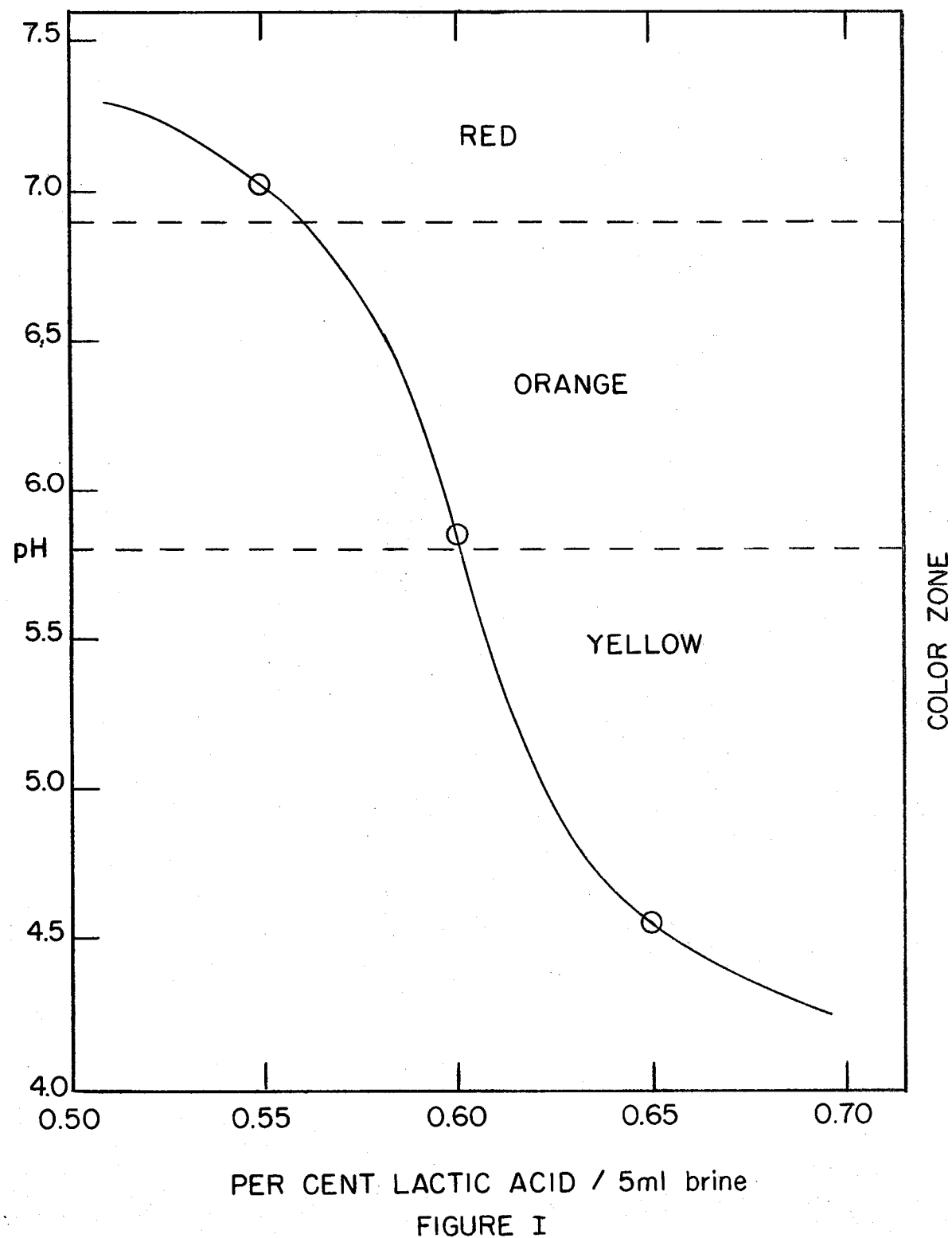
PER CENT LACTIC ACID / 5ml brine
FIGURE I 3,993,784

CONTROLLED FERMENTATION ACIDITY OF BRINED CUCUMBERS

A non-exclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

Controlled fermentation has long been one of the objectives in the vegetable salting industry, such as cucumber pickling. For years, the chemical, bacteriological and physical phenomena involved in the manufacture of, say, salt stock from green cucumbers by natural fermentation in brine, have been studied fairly definitively as has conversion of the salt stock to sweet, sour and mixed pickles followed by pasteurization and canning. This is likewise true of brine preservation of green beans, carrots, green tomatoes, okra, peppers, corn, and other vegetables and fruits, e.g., olives.

These studies quite naturally took into consideration salt concentrations and control thereof during brining and curing so that proper media for resultant microorganism activity could be effectively provided. It was found, for example, that among the microbial groups which grow during fermentation, sufficient salt-tolerant bacteria must be present to provide for the production of fermentation acids. The predominant acid is lactic acid, with a small amount of acetic acid being present. Obviously, the size and variety of cucumbers being pickled, brine temperature, general environmental conditions, and the like, are important to proper fermentation. It is also very important to avoid brine stock spoilage, including bloating and softening. Absence of proper conditions for the development of brine acidity can deleteriously affect the salt stock and the finished pickle products, such as dills, relishes, sours, sweets, and hamburger slices.

It can be appreciated, for example, that the brining of cucumbers for salt stock purposes in the South, such as the South Atlantic States, has generally been conducted in an environment which is significantly warmer than that in which similar brining procedures are carried out in the northern areas of the country, usually Midwestern States. One of the factors which has been of substantial concern is that the rate of lactic acid formation can vary greatly from area to area and even from vat to vat. Further, what is the effect of the traditional use of an inflexible schedule in which dry salt is introduced into the fermentation-brine solution throughout the salting operation? While much has been written about the desirability of controlling the brine concentration throughout the salt stock production, what effect does this have on the bacterial growth rate? For instance, it has been pointed out that brine acidity resulting from microbial activity develops more readily using low initial salt concentrations. On the other hand, high initial salt concentrations retard growth of lactic acid bacteria and consequently less acid is formed.

As is suggested from these facts and others prevalent in the literature, proper control of fermentation throughout the salting operation has been the subject of a great deal of concern. Accordingly, the present invention is directed to providing a means of control using brine acidity as the monitor to effect rapid and simple determination of the brine acidity.

A still further object of the present invention is a simple procedure for enhancing fermentation under varied conditions, such as conditions of temperature, brine concentrations, vegetable (e.g., cucumber) sizes, vegetable varieties, time of harvest, microbial flora, geographical area and the like.

Of interest in this regard are the following literature and patent references:

Jones, I. D., Industrial and Engineering Chemistry, 32, No. 6, 858–861 (1940).
Etchells, J. L., and Jones, I. D., American Journal of Public Health, 36, 1112–1122 (1946).
Etchells, J. L., Jones, I. D., and Bell, T. A., 1950–1951 Yearbook of Agriculture, 229–236 (1950).
Etchells, J. L., Bell, T. A., and Williams, C. F., Food Technology, 204–208, (May, 1958).
Etchells, J. L., and Moore, W. R., Jr., Pickle Pak Science 1:1–17 (1971) published by Pickle Packers International, Inc.
U.S. Pat. Nos. 3,480,448; 3,420,676; 3,410,755; 3,403,032; 3,374,099; 3,051,661; 2,905,594; 2,345,814.
West Germany: 1,199,023; 1,115,476.

Insofar as the standard used herein is concerned, viz., tris(hydroxymethyl)aminomethane, the following references are likewise of interest:

Fossum, J. H., Markunas, P. C., and Riddick, J. A., Analytical Chemistry, 23, No. 3, 491–493 (1951).
Whitehead, T. H. Journal of Chemical Education, 36, No. 6, 297 (1959).
Bell, T. A., Etchells, J. L., and Kelling, R. E., Journal of Food Science, 36, 1036–1038 (1971).

THE INVENTION

The present invention relates to a means of control of acid fermentation during the brining of vegetables, e.g., cucumbers, using brine acidity as the monitor and quickly determining brine acidity during intervals of the brining and curing period.

Schedules for the additions of dry salt to brined vegetables without careful regulation of brine acidity can readily retard desired bacterial growth and result in undesirable salt stock. As suggested hereinbefore, variables such as cucumber sizes and varieties, brine concentration, microbial flora present in the brine, temperature, other environmental conditions, etc., are very important in the pickling process. In brining and curing, certain salt-tolerant microorganisms called lactic acid bacteria are responsible for the necessary utilization of various organic constituents of the cucumber fruit which dissolve in the brine and become a source of nutrients for the microorganisms.

Since it is important not to noticeably retard or inhibit the growth of lactic acid bacteria, i.e., the rate of acid production, to insure final quality and preservation of brine-stock pickles, it behooves picklers to avoid going beyond the brine concentrations that retard or inhibit growth of lactic acid bacteria.

In the above-identified Etchells and Moore (1971) reference, it is pointed out that for effective brining the brine strength should be increased only after the lactic acid concentration has reached about 0.60% weight/volume, generally in about 7 to about 14 days, usually about 10 days. Unfortunately, checking the acidity during brining operations has heretofore been time consuming and required laboratory equipment and supplies. For example, the above reference of Etchells, Bell and Williams (1958), page 205, column 2, suggests the usual method for testing by collecting a sample of the brine and titrating a predetermined amount thereof with sodium hydroxide (0.111 N NaOH) to a faint pink end point with phenolphthalein as the indicator. Brine pH is measured wih a Beckman pH meter. Obviously, time, equipment and a quality control laboratory are involved in this system. Of course, if the brine is not to be tested immediately a preservative is needed.

Pursuant to the present invention, it has been discovered that fermentation can be significantly enhanced by using bring acidity as the monitor, and periodic salt additions can be made to optimize rather than hamper fermentation. According to the instant discovery, brine acidity is continually determined, throughout brining and curing, with tris(hydroxymethyl)aminomethane as the standard. More specifically, brine concentration is increased during fermentation when the acidity, represented by the lactic acid concentration, reaches between about 0.55% and about 0.65%, weight/volume, preferably about 0.60%. The total brine acidity as lactic acid produced by fermentation is established by neutralizing a small but predetermined amount of tris(hydroxymethyl)aminomethane with a sample of the brine. A small but effective amount of an indicator which changes color fairly sharply at about the equivalence point is used together with the standard and brine sample.

It has been found, pursuant to the instant invention, that 40.35 milligrams (mg) of tris(hydroxymethyl)aminomethane is equivalent to 5.0 milliliters (ml) of a brine solution containing 0.60% weight/volume lactic acid and that the end point or equivalence point is at pH 5.75. Of course, fractions or multiples of these quantities may be used, such as 1/5 the amount of each, namely 8.07 mg/1.0 ml.

Unfortunately, the more common standards heretofore employed to neutralize acidity, such as sodium hydroxide, sodium carbonate, barium hydroxide, and the like, are unsuited for the specific uses contemplated herein. Some of the drawbacks of the above-named chemicals are corrosiveness, high hygroscopicity, reaction with $CO_2$, prevention of a clear end point due to buffering action, and overall ineffectiveness with respect to brine acidity generally resulting from the presence of weak organic acids.

The standard of the present invention, on the other hand, does not suffer from these drawbacks. It has low hygroscopicity; aqueous solutions thereof are stable and do not absorb $CO_2$ from the air; it undergoes stoichiometric reaction, it has a negligible indicator blank; it is readily soluble in water; it is available in pure form; and it may be dried easily without adverse effects.

The indicators suggested in the above references of Fossum et al. (1951) and Whitehead (1959) are likewise ineffective and unsuited for testing brine solutions herein contemplated by virtue of their inability to provide meaningful end points. Among the indicators within the purview of the present invention are those which provide a distinct and clear color change at the equivalence point derived from the potentiometric titration curve resulting from titrating tris(hydroxymethyl)aminomethane with lactic acid. It has been found from potentiometric titration curves using 0.10N lactic acid, 0.10N acetic acid, or a 1:3 acetic-lactic mixture to titrate 5 milliliter amounts of 1.0 N tris(hydroxymethyl)aminomethane that the equivalence point for lactic acid is at pH 5.75, for acetic acid at 6.30 and for the mixture at 6.0. Typically, phenol red is a very effective indicator. Bromthymol blue which changes from dark blue (alkali) to green, then to a distinct yellow at pH 6.0, may likewise be used. Phenol red is preferred, however; it changes from cherry red at pH 7.0 to orange, then to a very bright yellow at pH 5.8.

Other indicators which provide a distinct color change in the range of about pH 5.8 to about pH 6.0 and which may be used herein are para-nitrophenol, alizarin, cresol red, and neutral red. Mixed indicators may also be used herein, typically a combination of bromcresol green and methyl red.

FIG. 1 of the drawing illustrates the potentiometric curve of a 40.35 milligram concentration of tris(hydroxymethyl)aminomethane and from 0.50 to 0.70% lactic acid showing pH values and color changes (zones) of the phenol red indicator.

In accordance with a preferred embodiment of the instant discovery, a relatively thin and pure, highly absorbent cellulosic sheet, such as filter or chromatography paper, is carefully and evenly impregnated with an aqueous solution of substantially pure (e.g., better than about 99% purity) tris(hydroxymethyl)aminomethane as a standard and a very small amount of a suitable indicator, such as from about 0.03 to about 0.15% by weight phenol red, based upon the total weight of standard and indicator. As will be seen in the Examples herein in more detail, impregnation is carried out accurately followed by careful drying of the paper. The concentration of the standard in a given test paper provides an equivalence to a predetermined volume (e.g., 5.0 ml) of brine solution containing 0.60% lactic acid. This procedure may be varied by using fractions or multiples of the amount of standard and brine solution as hereinabove indicated.

According to a still further embodiment of the present invention, the tris(hydroxymethyl)aminomethane is compounded into a tablet, pill or capsule which can be rapidly dissolved. Predetermined concentrations, similar to those given for the test paper, of the crystalline standard and the indicator are thoroughly blended with, for instance, sufficient sodium chloride filler, or the like, to make a tablet or capsule of convenient size using, say, a minor amount of pure water as a binder.

Typically, pursuant to the invention, a method may be followed which comprises periodically, e.g., daily during brining and curing of cucumbers, sampling the brine solution and contacting a predetermined amount of the sample with a cellulosic sheet or test paper which has been impregnated with the standard and indicator. Impregnation is preferably carried out by saturating the paper with an aqueous solution of a substantially pure tris(hydroxymethyl)aminomethane standard and a small but effective amount of an indicator, such as phenol red. The resulting impregnated paper is then carefully dried. This procedure, as will be seen hereinbelow, is carried out such that the amount of standard in the test paper provides the equivalent chemical required for neutralization of a predetermined amount of brine sample containing about 0.60% lactic acid. The end point occurs at a pH of about 5.75.

Thus fermentation is observed and can be controlled by using brine acidity as the monitor and continually and rapidly determining brine acidity with tris(hydroxymethyl)aminomethane as the standard. The testing materials contemplated herein are known as Q-BAT testing papers or tablets useful for providing a quick-brine-acidity-test in the salting of vegetables, especially cucumbers.

EXAMPLES

The present invention will best be understood from the following Examples which are intended to be illustrative only and not meant to be unduly limitative. Unless otherwise indicated, parts and percentages are given by weight.

EXAMPLE I

A 6 to 8-inch cushion of 25 degrees salometer brine (6.6% salt by weight) is placed in a well-cleaned tank, the tank being about 8 feet deep, having about a 10 foot diameter, and a capacity of about 500 bushels of cucumbers. The tank is filled heaping full with freshly harvested cucumbers graded to size (small, up to 1 1/16 inches; medium 1 1/16–1½ inches; and large, 1½–2⅛ inches diameter), then the stock is allowed to settle to about one (1) foot below the top of the tank. A record is best kept of the number of 50-lb. bushels or total weight of cucumbers in the tank in hundred-weights (cwt).

The cucumbers are covered with a "false" head of wooden boards keyed down securely with 2-inch × 4-inch boards. The head boards should provide plenty of avenues for the fermentation gas to escape; ⅜-inch holes in the head boards will help the gas escape. Brine (25 degrees salometer) is added until the brine level is 4 to 6 inches above the head boards and about 4 inches below the top of the tank. This extra space is needed since dry salt has to be put on the head, either in the solid or dissolved state. At this point, dry salt is added on the head, the amount being calculated to maintain the initial salt concentration of 25 degrees salometer. This turns out to be about 6 1/5 lbs. of salt for every 100 lbs. of cucumbers in the tank, or a total of 1550 lbs. for a 500 bushel tank. Only about ⅔ of the salt is added at first, the remaining ⅓ being added the next day.

The brine strength is held at 25 degrees salometer until 0.60% lactic acid is formed at brine temperatures in the range of 75° to 78° F., which takes about 7 to 14 days. The concentration of lactic acid is determined using the test paper of the present invention and in the manner taught in Example II, infra. Having reached the 0.60% lactic acid concentration, the brine strength is raised gradually (by addition of dry salt on the head) at the rate of 3 to 5 degrees salometer per week, up to 50–60 degrees salometer, and maintained at that concentration. About ½ lb. of salt is required for every 100 lbs. of cucumbers in the tank to raise the brine strength 1 degree salometer. This is based on a ratio of cucumbers to brine of 65:35% by weight.

If small-size cucumbers are being brined, the original cover-brine is preferably drained off 36–48 hours after filling and brining the tank and replaced with a new brine of the same strength (25 degrees salometer). This procedure is designed to drain away any softening enzymes that otherwise would deteriorate the texture of the brined material. In southeastern and southwestern areas of the United States draining off the original cover-brine, as just indicated, is a widely accepted practice.

The above brining conditions are designed for latitudes of the United States where the brine temperatures range from about 70° to about 80° F., usually about 75° to about 78° F. For brine temperatures in the 81°–85° F. range a 28° salometer cover-brine is suggested; and for brine temperatures of 86° F. and above, a 30°–32° salometer cover-brine is used.

EXAMPLE II

An aqueous solution of 99.9% pure tris(hydroxymethyl)aminomethane (29% weight/volume) and 0.05% phenol red is prepared with pure water and sheets of No. 1 Whatman chromatography paper (16¼ inches by 25 inches) impregnated therewith. The aqueous solution is placed in a stainless steel chromatography tray (25 inches long, 1.5 inches wide and ⅝ inch deep), the inner bottom surface of the tray being concave and resembling, in cross section, a one-half circle. A 5/16 inch diameter glass rod, 24 inches long, is bent (2 inches from each end) at right angles like a towel rod. One-half sheet (16¼ inches × 12½ inches) of the paper is passed lengthwise through the solution in the tray between the bottom of the tray and the long section of glass rod resting thereon. The process is carried out at a rate such that residence time in solution for each portion of the paper is about 0.5 minute. In addition to passing between the rod and the bottom of the tray, the paper is pressed against the exit edge of the tray and thus wiped as it is pulled from the solution and tray. Next, the impregnated paper is dried on the inert surface of plastic-coated freezer paper.

Upon drying thoroughly, the thus-treated paper is cut into 1.25 × 1.25 inch squares (32 × 32 mm.) for use as test papers as follows:

1. Fold a single test paper into thirds.
2. Drop to the bottom of a clean test tube, preferably a tube about 16 millimeters (mm.) in diameter and 100 mm. in length.
3. Pipette a 5 ml. brine sample into the tube containing the test paper; the brine should come to the top of the paper.
4. Shake gently for 2–3 seconds.
5. After 2 or 3 minutes the color of the brine sample and paper should be the same; when it appears certain there will be no further color change, record the results of the test in one of the three categories given below:

Red = negative, i.e., less than 0.50% lactic acid.
Orange = about 0.55% lactic acid.
Yellow = positive, i.e., 0.60% lactic acid and higher.

Thirty-two cucumber brines from different commercial pickle tanks after about 10 to 20 days of brining are tested as just described, promptly upon withdrawing each sample from the tank. Also, titratable acidity as percent lactic acid is made on preserved samples brought back to the laboratory. The test papers as described above show the following results:

12 brines, *red* with lactic acid titrations of 0.52% and below; 3 brines, *orange* with 0.52–0.59%; and 17 brines, *yellow* with 0.62% and above. As is evident, the results of these tests are in close agreement with the above three categories as designed for testing.

Example III

Tablets are prepared by mixing powdered 99.9% pure tris(hydroxymethyl)aminomethane in the amount of 40.35 milligrams (mg.) per tablet with 59.55 mg. of powdered 99.9% pure sodium chloride and 0.1 mg. of phenol red. Granulation is effected by the addition of purified water in the classical manner of wet granulation. After wet screening through a number 20 sieve the batch is dried at 122° F. for 16 hours, then re-screened through a number 20 sieve.

The tablets are compressed in the conventional manner to a total weight of 100 mg. and a hardness of 3 to 5 on the Stokes tester using 9/32 inch standard concave punches. The tablets must contain less than 2% moisture by weight.

The tablets prepared in this manner will absorb moisture readily and will thus dissolve quickly during the subsequent lactic acid test procedure. Packaging of the completed tablets is preferably in glass in order to prevent moisture from dissolving the tablets prior to use. The area of manufacture should be of low humidity, preferably below 40% relative humidity, for the same reason.

Tablets prepared as described above are used to rapidly test for lactic acid concentration as follows:
1. Place one tablet into the bottom of a clean test tube, preferably having a diameter of 16 mm. and a length of 100–150 mm. Then, add one to two drops of water.
2. Pipette a 5.0 ml. brine sample into the tube containing the tablet.
3. Shake gently for 5–10 seconds or until the tablet has completely dissolved and no more color change occurs.
4. Record the results as:
Red = negative, i.e., less than 0.50% lactic acid;
Orange = about 0.55% lactic acid;
Yellow = positive, i.e., 0.60% lactic acid or higher.

Tablets prepared as just described are tested with commercial pickle brines and compared to titration method gave the following results. Four companies in different parts of the country carried out the tests. With a total of 267 pickle brines, 48 tested Red, about 0.50% or less acid; 29 tested Orange, about 0.55% lactic acid; and 190 tested Yellow with 0.60% lactic acid and above. In general, there was good agreement between the tablet test and the titration results.

EXAMPLE IV

Tablets are likewise prepared according to the formula:

| | per tablet |
|---|---|
| tris(hydroxymethyl)aminomethane, 99.9% pure | 40.35 mg. |
| phenol red | 0.1 mg. |
| lactose powder U.S.P. anhydrous | 58.55 mg. |
| talc, U.S.P., 280 to 325 mesh | 1.0 mg. |
| purified water | q.s. |

The phenol red is dissolved in a small quantity (0.05 ml.) of water and this solution is added to a mixture of the other ingredients, except for the talc. Granulation is accomplished by adding more water in the classical wet granulation method. After screening, drying and screening as in Example III, above, the talc is added dry through a 280 mesh sieve.

Tabletting is done using ¼-inch punches to a total tablet weight of 100 mg. and hardness of 3–5 on a Stokes hardness tester. The tabletting area should be below about 40% relative humidity during compression, and the finished tablets should be stored in glass containers.

The tablets are used in lactic acid tests as in Example III, above.

While Examples III and IV describe a desirable embodiment of the present invention using tablets instead of test papers, it should be understood that tablets suitable for use herein may be compounded in a number of ways. For example, tablets can be prepared according to the following type formula provided the requirements listed hereinbelow are followed:

| | |
|---|---|
| tris(hydroxymethyl)aminomethane, 99.9% pure | 40.35 mg. |
| indicator (e.g. phenol red or brom-thymol blue) | 0.1 mg. |
| diluent (e.g. sodium chloride or lactose) | 0 to 80.0 mg. |
| binder (e.g. starch or glucose) | 0 to 30.0 mg. |
| lubricant (e.g. Mg stearate or mineral oil) | 0 to 10.0 mg. |
| disintegrant (e.g. starch or talc) | 0 to 10.0 mg. |

The additives to the above general formula (i.e., ingredients other than the tris(hydroxymethyl)aminomethane and indicator) should not be acidic or basic or have any degree of buffer capacity;

the additives should not alter the color or color change of the indicator;

the additives used should not prolong disintegration/dissolution time of the finished tablet, this requirement applying primarily to the binder and lubricant;

the indicator should give a marked color and color change, as indicated hereinabove, at the appropriate pH;

the diluent should add compressibility, since the tris(hydroxymethyl)aminomethane is a non-compressible crystalline material, and the diluent should accomplish this without having to be added in such large quantities that the finished tablet is so large as to be unwieldly in the test procedure.

Pursuant to statutory requirements, there are described above the invention and what are now considered its best embodiments. It should be understood, however, that the invention can be practiced otherwise than as specifically described, within the scope of the appended claims.

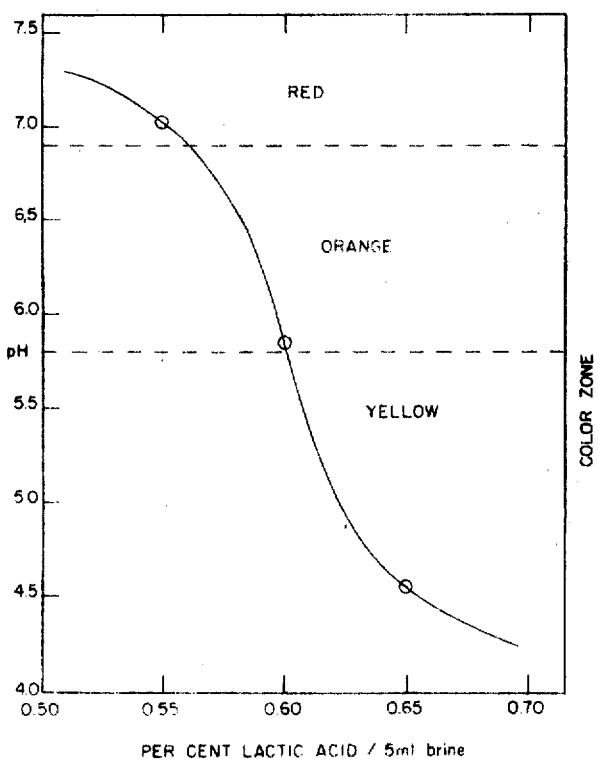

What is claimed is:

1. In the salting of cucumbers, the process which comprises controlling fermentation using brine acidity as the monitor and continually and rapidly throughout the fermentation process determining brine acidity with tris(hydroxymethyl)aminomethane as a standard and a small but effective amount of an indicator which undergoes a distinctive color change at the equivalence point in the pH range of about 7.0 to about 4.5, increasing the salt concentration when the brine acid concentration reaches from about 0.55% to about 0.65% weight/volume of the brine solution, the brine acid concentration being determined by neutralizing a relatively small but predetermined amount of the tris(hydroxymethyl)aminomethane containing said indicator with a brine sample containing said brine acid.

2. The process of claim 1 wherein the salt concentration is increased during fermentation when the brine acidity represented by lactic acid concentration reaches about 0.60% of the brine solution.

3. The process of claim 2 wherein the equivalence point for lactic acid is at pH 5.75 and sufficient tris(hydroxymethyl)aminomethane is present to neutralize a predetermined quantity of brine solution containing about 0.60% lactic acid.

4. The process of claim 3 wherein 40.35 milligrams of tris(hydroxymethyl)aminomethane is equivalent to 5.0 milliliters of the brine solution containing 0.60% lactic acid, by weight.

5. The process of claim 4 wherein the indicator is phenol red which changes at about pH 7.0 from cherry red to orange and at about pH 5.8 from orange to bright yellow, thus indicating, upon turning yellow, a lactic acid concentration of at least about 0.60% weight/volume in the brine solution.

6. The process of claim 2 wherein a cellulosic sheet is impregnated with the relatively small but predetermined amount of tris(hydroxymethyl)aminomethane.

7. The process of claim 1 wherein the brine acid is lactic acid.

* * * * *

UNITED STATES PATENT OFFICE
CERTIFICATE OF CORRECTION

Patent No. 3,993,784                    Dated November 23, 1976

Inventor(s) Thomas A. Bell et al.                    Page 1 of 2

It is certified that error appears in the above-identified patent and that said Letters Patent are hereby corrected as shown below:

The cover sheet should be canceled and the cover sheet as shown on the attached sheet substituted therefor.

Signed and Sealed this

First Day of March 1977

[SEAL]

Attest:

RUTH C. MASON
Attesting Officer

C. MARSHALL DANN
Commissioner of Patents and Trademarks

United States Patent [19]

Bell et al.

[11] 3,993,784

[45] Nov. 23, 1976

[54] CONTROLLED FERMENTATION ACIDITY OF BRINED CUCUMBERS

[75] Inventors: Thomas A. Bell; John L. Etchells; Raymond E. Kelling, all of Raleigh, N.C.

[73] Assignee: The United States of America as represented by the Department of Agriculture, Washington, D.C.

[22] Filed: May 11, 1972

[21] Appl. No.: 252,409

[52] U.S. Cl. .............................. 426/49; 426/231; 23/253 TP; 252/408
[51] Int. Cl. .............................. A23b 7/10
[58] Field of Search ................. 99/156; 23/253 TP; 252/408; 426/50, 49

[56] References Cited
UNITED STATES PATENTS

| | | | |
|---|---|---|---|
| 3,236,601 | 2/1966 | Harvill | 23/253 TP |
| 3,255,019 | 6/1966 | Engelland | 99/156 |
| 3,374,099 | 3/1968 | Bell et al. | 99/156 |

OTHER PUBLICATIONS

Bell, T. A., Etchells, J. L., and Kelling, R. E., Journal of Food Science, 36, 1036–1038, Nov. 1971.

Bell, T. A., et al., Journal of Food Science, 26, No. 1, pp. 84–90, 1961.

Whitehead, T. H., Chemical Abstracts, vol. 53, 21366i, 1959.

Fossum, J. H., Chemical Abstracts, vol. 45, 4599i, 1951.

Riddick, J. A., Chemical Abstracts, vol. 56, 10884d, 1962.

Etchells, J. L. et al., Food Technology, vol. XII, No. 5, pp. 204–208, May 1958.

The Canning Trade, *A Complete Course in Canning*, 9th ed. 1969, pp. 473–481.

*Primary Examiner*—A. Louis Monacell
*Assistant Examiner*—Curtis P. Ribando
*Attorney, Agent, or Firm*—Irons & Sears

[57] ABSTRACT

In the salting of vegetables, such as cucumbers, control of fermentation using brine acidity as the monitor and continually and rapidly determining brine acidity with tris(hydroxymethyl)aminomethane as a standard.

7 Claims, 1 Drawing Figure